Patented Apr. 5, 1938

2,113,539

UNITED STATES PATENT OFFICE 2,113,539

PIGMENTS OF IMPROVED WETTING, DISPERSING, AND NONSETTLING CHARACTERISTICS AND THE PROCESS OF MANUFACTURING SAME

Walter F. Meister, Elizabeth, N. J., assignor to United Color and Pigment Company, Inc., Newark, N. J., a corporation of New Jersey No Drawing. Application June 7, 1933, Serial No. 674,694

11 Claims. (Cl. 134—78)

This invention relates to new and useful improvements in the manufacture of pigments, in particular to a lithopone having improved wetting, dispersing and non-settling characteristics when incorporated in paint and varnish vehicles and to a method for its production.

While my invention relates in particular to lithopone it is applicable also to other white pigments such as titanium dioxide or the various pigments containing titanium dioxide, pure zinc sulphide and the various pigments containing zinc sulphide in higher percentage than is present in ordinary lithopone, basic carbonate white lead, the extender pigments, such as blanc fixe, barytes, china clay, silica, whiting, etc. My invention is also applicable to the various colored pigments such as the chrome yellows, oranges, and greens, etc.

Lithopone is a white pigment which is widely used in the paint and varnish and other industries; it is a composite pigment containing approximately 30% zinc sulfide and 70% barium sulfate. A common method of preparing lithopone is by co-precipitation of the above stated compounds from solutions of zinc sulfate and barium sulfide; the resulting precipitate is filter-pressed, dried, calcined at a suitable temperature, quenched in water and then ground to a fine state of division while wet, then washed, filter-pressed, dried, and disintegrated to a fine powder.

Ordinary lithopone sometimes possesses the disadvantage of poor wetting in some paint and varnish vehicles. Due to this difficulty of wetting it often forms a more or less plastic mass when mixed with the paint vehicle. The usual paint mixing operation is carried out in vertical cylindrical iron mixers of varied capacities, the mixing, i. e. stirring, being effected by means of vertical rotating paddles. The usual procedure is to first introduce the vehicle and then add the proper amount of lithopone. Among the disadvantages in the production of acceptable paint from ordinary lithopone are the additional power required to force the mass to become thoroughly uniform and sufficiently soft to be ground through the buhr-stone or other type of mill, and the decreased capacity of a given equipment entailed by this increased time interval required for mixing. In the use of pebble mills for the manufacture of paint, pursuant to more recent practice, ordinary lithopone requires an undue time interval for grinding to produce a smooth homogeneous paint in which the particles are thoroughly dispersed.

Ordinary lithopone when readily wetted and dispersed in some paint and varnish vehicles sometimes possesses the disadvantage of settling as a hard difficultly re-stirrable cake in the bottom of the paint container.

I have now discovered that water-insoluble organic compounds, such as the stearates of aluminum, lead, zinc, etc., and in particular the fatty acid esters of glycol, such as glycol distearate when adsorbed upon the faces of the lithopone particles, thereby coating the particles, causes the individual particles thus coated to be more readily dispersed in such paint or varnish vehicles. Furthermore I have discovered that lithopone so treated has less tendency to settle out in the form of a hard difficultly re-stirrable cake in the bottom of the paint container.

By my method, the adsorption of the water-insoluble organic compound upon the faces of the lithopone particles is effected substantially continuously and uniformly throughout, thereby precluding the occlusion of air or other foreign material on the particle faces, and thereby expediting at the later stage the uniform wetting of the particle faces by and dispersion of the lithopone particles in paint and varnish vehicles and/or preventing settling to a hard cake.

The method of my invention is as follows:

A water slurry is formed of the lithopone after the same has been calcined and ground to a fine state of subdivision; the water insoluble organic compound is dissolved in a small amount of an organic solvent such as mineral spirits and then added to and mixed in the water slurry. Mineral spirits is a cheap petroleum distillation product quite generally used as a thinner in the paint and varnish industry.

A remarkable phenomenon occurs—the mineral spirits is not soluble in water nor is the organic compound, yet the lithopone adsorbs, practically uniformly distributed over the surfaces of its particles, the organic compound from the mineral spirits solution. It is to be understood however that my invention is not limited to the use of mineral spirits nor to the use of an organic solvent which is insoluble in water. The lithopone slurry is preferably made slightly alkaline. The slurry preferably contains approximately two parts of water to one part of pigment and is contained in a suitable tank of wood or other inert material. Mechanical means of agitation may be employed or not, as preferred.

I am aware that it has been proposed to coat pigments by forming a solution of aluminum stearate in mineral spirits, immersing the pigment in the solution and then driving off the solvent. (Pages 98 and 99, Circular 320, American Paint & Varnish Manufacturers' Association—January 1928.) It is obvious that such a process is not practical. The amount of solvent required for wetting the pigment in order to get a distribution of the aluminum stearate on the particles of the pigment would be entirely too great for practicability. The recovery of the solvent by distillation would be a very expensive and difficult operation necessarily also entailing considerable losses. This proposal does not in any way disclose the preferential adsorption by lithopone of an organic compound, from a small amount of an organic solvent which is not soluble in water, when mixed with an aqueous suspension of the lithopone.

I am also aware that it has been proposed to render lithopone insensitive to light by adding thereto a soap of an earth alkali or of aluminum, at any stage of the process after the calcination, by dry or wet grinding the prepared lithopone with the soap or by adding the soap to the binding medium (vehicle) of the paint. I am also aware that it has been proposed to add to lithopone suspended in a solution of an ordinary soap a compound of an earth alkali or of aluminum which will react with the ordinary soap to form an alkali earth or an aluminum soap in the presence of the pigment. I am also aware that it has been proposed to form these soaps by adding the oxides of the metals to the binding medium (vehicle) whereby the soaps are formed by interaction with the binding medium. (Allendorf—British 23,587—1906.) These methods are, however, quite different from the method which I have discovered.

I am also aware that it has been proposed to treat lithopone with a water soluble soap such as sulfonated castor oil soap and that in the course of this proposal it has been stated that "insoluble soaps are not satisfactory, presumably due to the lack of proper distribution on the lithopone particles". (Booge U. S. Patent 1,722,174—July 23, 1929.)

My discovery has made it possible to obtain entirely satisfactory uniform distribution on the lithopone particles not only of water insoluble soaps but also of water insoluble organic compounds in general and in particular the water insoluble esters of glycol, such as glycol di-stearate.

I am also aware that it has been proposed to coat lithopone with fatty acids such as oleic acid and stearic acid by adding one or more of these acids to the aqueous slurry of lithopone prior to wet milling (O'Brien U. S. Patents 1,832,416 and 1,832,417 of November 17, 1931). I am also aware that it has been proposed to coat lithopone with a salt of alginic acid by milling the pigment in the presence of an aqueous solution of a salt of alginic acid and then drying the pigment in a steam drum drier or a spray drier. (O'Brien U. S. Patent 1,832,418 of November 17th, 1931.)

In carrying out my invention the proportional quantity of water insoluble organic compound by weight of the lithopone may be approximately .25 of 1%, but the same may vary as is found desirable for attaining the objects of my invention. From the tests made under commercial conditions, the range of the proportion of water insoluble organic compound to lithopone by dry weight may vary from .1 of 1% to 5%.

It is preferable to add the water insoluble organic compond to the water slurry of lithopone very slowly and uniformly, and to continue the stirring for an hour or so after the last addition has been made. By such procedure of admixture in situ, the dissolved water insoluble organic compound is precipitated uniformly and continuously over the faces of the lithopone particles.

The lithopone slurry may be heated or not during the stage of treatment as above described, since the desired precipitation and distribution upon the lithopone particles take place effectually whether the slurry is cold or heated.

Having now described my invention I give in detail one example illustrating how it may be carried out. It is to be understood, however, that the invention is not to be limited to this example. It is desired that as broad an interpretation be placed upon the appended claims as may be permissible in view of the prior art.

To one ton of lithopone dispersed in two tons of water at a temperature of about 25° C., is slowly added with constant agitation, a solution of 10 pounds of glycol di-stearate in 35 pounds of mineral spirits at a temperature of about 50° C. Agitation is continued for one hour. The lithopone is then filtered, dried, and disintegrated in the usual manner.

In the use of lithopone formed pursuant to my invention, the water-insoluble organic compound by reason of its solvency or its ready dispersion in the paint vehicle effects a complete and rapid wetting of the individual particles, and the dispersion of the particles within the vehicle of the formed paints. The presence of the water insoluble organic compound film about the faces of the particles maintains separation of the particles and consequently precludes aggregation or cementing of the particles and the occlusion of any foreign material, e. g., air, at the particle faces. By reason of the above stated properties, the time interval required for mixing the lithopone and the vehicle before introduction into the buhr-stone or other type of mill, is materially reduced. Similarly, when grinding paint in a pebble mill, substantial reduction of time for complete grinding is attained. Accordingly, my invention results in the distinct economic advantage of decrease of required time interval in the manufacture of paint. Furthermore, and in many cases of equal or greater importance the paint so prepared is more stable in that the pigment portion remains in a soft easily re-stirrable mass and does not form a hard cake in the bottom of the container.

Examples of suitable paint vehicles are linseed oil, both raw and cooked, soya bean oil, China-wood oil, and varnishes of the artificial resin, of the natural resin and of the ester gum types and the like. It will be understood by those skilled in the art that these vehicles are often used with a variable quantity of mineral spirits or like thinner.

My invention includes the production of lithopone and other pigments of improved wetting, and dispersing and non-settling characteristics in paint and varnish vehicles by the use of metallic soaps such as aluminum stearate, calcium stearate, magnesium stearate, lead stearate, zinc stearate and other water-insoluble metallic soaps which are either soluble in paint vehicles or readily dispersed to a colloidal state in these vehicles.

This application is a continuation in part of my copending application Serial Number 425,356, filed February 1st, 1930, entitled Lithopone composition and process of making same.

Whereas I have described my invention by reference to specific forms thereof, it will be understood that many changes and modifications may be made without departing from the spirit of the invention.

I claim:

1. The art of coating pigment particles with a coating agent selected from the group of those metallic soaps and fatty acid esters of glycol which are water insoluble but soluble in linseed oil, soya bean oil, China-wood oil, and varnishes of the artificial resin, and of the natural resin and of the ester gum types serving as a paint vehicle, to derive a pigment having improved wetting, dispersing and non-settling characteristics effective in a paint employing such vehicle which comprises dissolving such coating agent in a water-insoluble organic solvent which is soluble in such paint vehicle and adding the resulting solution to an aqueous dispersion of the pigment.

2. The art of coating lithopone particles with a coating agent selected from the group of those metallic soaps and fatty acid esters of glycol which are water insoluble but soluble in linseed oil, soya bean oil, China-wood oil, and varnishes of the artificial resin, and of the natural resin and of the ester gum types serving as a paint vehicle, to derive lithopone having improved wetting, dispersing and non-settling characteristics effective in a paint employing such vehicle which comprises dissolving such coating agent in a water-insoluble organic solvent which is soluble in such paint vehicle and adding the resulting solution to an aqueous dispersion of the lithopone.

3. The art of coating pigment particles with a coating agent selected from the group of those metallic soaps which are water insoluble but soluble in linseed oil, soya bean oil, China-wood oil, and varnishes of the artificial resin, and of the natural resin and of the ester gum types serving as a paint vehicle, to derive a pigment having improved wetting, dispersing and non-settling characteristics effective in a paint employing such vehicle which comprises dissolving such coating agent in a water-insoluble organic solvent which is soluble in such paint vehicle and adding the resulting solution to an aqueous dispersion of the pigment.

4. The art of coating pigment particles with a coating agent selected from the group of those fatty acid esters of glycol which are water insoluble but soluble in linseed oil, soya bean oil, China-wood oil, and varnishes of the artificial resin, and of the natural resin and of the ester gum types serving as a paint vehicle, to derive a pigment having improved wetting, dispersing and non-settling characteristics effective in a paint employing such vehicle which comprises dissolving such fatty acid ester of glycol in a water-insoluble organic solvent which is soluble in such paint vehicle and adding the resulting solution to an aqueous dispersion of the pigment.

5. The art of coating lithopone particles with a coating agent selected from the group of those metallic soaps which are water insoluble but soluble in linseed oil, soya bean oil, China-wood oil, and varnishes of the artificial resin, and of the natural resin and of the ester gum types serving as a paint vehicle, to derive lithopone having improved wetting, dispersing and non-settling characteristics effective in a paint employing such vehicle which comprises dissolving such metallic soap in a water-insoluble organic solvent which is soluble in such paint vehicle and adding the resulting solution to an aqueous dispersion of the lithopone.

6. The art of coating lithopone particles with a coating agent selected from the group of those metallic soaps which are water insoluble but soluble in linseed oil, soya bean oil, China-wood oil, and varnishes of the artificial resin, and of the natural resin and of the ester gum types serving as a paint vehicle, to derive lithopone having improved wetting, dispersing and non-settling characteristics effective in a paint employing such vehicle which comprises dissolving such metallic soap in mineral spirits and adding the resulting solution to an aqueous dispersion of the lithopone.

7. The art of coating lithopone particles with a coating agent selected from the group of those fatty acid esters of glycol which are water insoluble but soluble in linseed oil, soya bean oil, China-wood oil, and varnishes of the artificial resin, and of the natural resin and of the ester gum types serving as a paint vehicle, to derive lithopone having improved wetting, dispersing and non-settling characteristics effective in a paint employing such vehicle which comprises dissolving such fatty acid ester of glycol in a water-insoluble organic solvent which is soluble in such paint vehicle and adding the resulting solution to an aqueous dispersion of the lithopone.

8. The art of coating lithopone particles with a coating agent selected from the group of those fatty acid esters of glycol which are water insoluble but soluble in linseed oil, soya bean oil, China-wood oil, and varnishes of the artificial resin, and of the natural resin and of the ester gum types serving as a paint vehicle, to derive lithopone having improved wetting, dispersing and non-settling characteristics effective in a paint employing such vehicle which comprises dissolving such fatty acid ester of glycol in mineral spirits and adding the resulting solution to an aqueous dispersion of the lithopone.

9. The art of coating lithopone particles with a coating agent which is insoluble in water but soluble in linseed oil, soya bean oil, China-wood oil, and varnishes of the artificial resin, and of the natural resin and of the ester gum types serving as a paint vehicle, to derive lithopone having improved wetting, dispersing and non-settling characteristics effective in a paint employing such vehicle, which comprises dissolving glycol di-stearate in a water-insoluble organic solvent which is soluble in such paint vehicle and adding the resulting solution to an aqueous dispersion of the lithopone.

10. The art of coating lithopone particles with a coating agent which is insoluble in water but soluble in linseed oil, soya bean oil, China-wood oil, and varnishes of the artificial resin, and of the natural resin and of the ester gum types serving as a paint vehicle, to derive lithopone having improved wetting, dispersing and non-settling characteristics effective in a paint employing such vehicle, which comprises dissolving glycol di-stearate in mineral spirits and adding the resulting solution to an aqueous dispersion of the lithopone.

11. The art of coating pigment particles with a coating agent which is insoluble in water but soluble in linseed oil, soya bean oil, China-wood oil, and varnishes of the artificial resin, and of the natural resin and of the ester gum types serving as a paint vehicle, to derive a pigment having improved wetting, dispersing and non-settling characteristics effective in a paint employing such vehicle which comprises dissolving glycol distearate in a water-insoluble organic solvent which is soluble in such paint vehicle and adding the resulting solution to an aqueous dispersion of the pigment.

WALTER F. MEISTER.